(No Model.)

A. W. BROWNE.
FLEXIBLE SHAFT FOR DENTAL ENGINES.

No. 492,266.  Patented Feb. 21, 1893.

Witnesses
Edw. F. Simpson, Jr.
Jacob N. Belt

Inventor
A. W. Browne
By _____ Attorney

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

FLEXIBLE SHAFT FOR DENTAL ENGINES.

SPECIFICATION forming part of Letters Patent No. 492,266, dated February 21, 1893.

Application filed April 26, 1892. Serial No. 430,700. (No model.)

*To all whom it may concern:*

Be it known that I, ARTHUR W. BROWNE, of Prince's Bay, in the county of Richmond and State of New York, have invented certain new and useful Improvements in Flexible Shafts for Dental Engines, of which the following is a specification.

My invention relates to certain improvements, as hereinafter claimed, in flexible shafts or cables of the class employed in dental engines for communicating rotary motion to drills, disks, &c., and my objects mainly are to so construct such shafts as to impart to them greater strength and increased durability and lessen liability of their becoming kinked or set "out of true" under flexure.

Figure 1:
Figure 2:
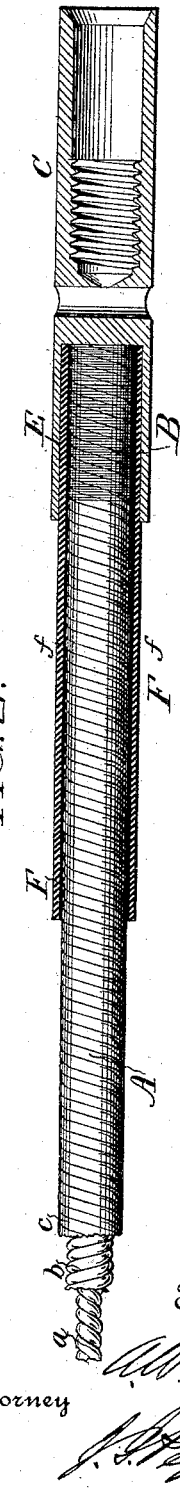

In the accompanying drawings, Figure 1 is a longitudinal view showing the shaft, in part, and attachments thereof connected thereto in accordance with my invention, with the hand-piece spindle end detached; Fig. 2 a longitudinal view on an enlarged scale, partly in section, showing particularly the connection of the shaft with the hand-piece coupling and attached metal guard; and Fig. 3 a similar view showing a modification.

In the ordinary way of making the flexible shafts several lengths of coiled wire, usually three coils, the one within another, and each under tension, are employed. The coils are made up in suitable lengths, say one hundred feet, more or less, and are soldered together at intervals corresponding with the lengths of shafts desired, say at intervals of twenty-six inches, so as to hold them together under tension; and next the coils are severed at the soldered portions, each length so produced serving for a dental engine flexible shaft. Then each shaft has soldered to one extremity a coupling end for connection with a hand piece, and to its opposite extremity a stiff shaft section for connection with a driven-pulley of a dental engine, soft solder (as lead and tin) being employed in attaching these end connections as well as in uniting the coils in lengths suitable for shafts.

In shafts when constructed in the above referred to old way in some cases the solder holding the coils together becomes so heated during the subsequent soldering in place of the coupling ends and stiff-shaft sections as to soften and permit the coils to separate and unwind. Now by my improvement I am enabled to employ a hard solder (as an alloy of copper and zinc for instance) for uniting the coils in shaft lengths, this solder being of a higher fusing point than the ordinarily used soft solder, and for securing the end-connections I make use of soft solder, and so there is no liability of softening the solder uniting the coils, and their union is left unimpaired.

Referring now to the drawings, the flexible shaft for cable A is shown as composed of the coils $a$ $b$ $c$ which are soldered together at their ends by hard solder as above explained, the solder being indicated by the shading at B, at one end of the shaft, in Fig. 2. The end-connections (the hand-piece coupling C, and stiff shaft sections D) are the same, substantially, as commonly employed, but instead of securing the ends of the shaft directly to these end-connections by soldering one end of the shaft in the socket E of the hand piece coupling, and the other end in a similar socket at $d$ in the stiff shaft section, as heretofore has usually been the practice, I employ in attaching each of the end connections a metal sleeve F serving as a tubular guard to check lateral play or flexure of the shaft adjacent to the end-connections. As these guards are alike and are secured in similar manner, description of one and the manner of its attachment will answer for both. The internal diameter of the guard somewhat exceeds the external diameter of the shaft, and its length which may be one and one half inches, more or less, considerably exceeds the length of that portion of the shaft end having the hard solder applied to it. The guard is slipped upon the shaft end and is soldered in place with soft solder, care being taken that the solder shall extend along from the end of the shaft for only a portion of the length of the guard, say to about the point $f$, thus leaving the shaft free within the guard at and for some distance from the open end or mouth of the guard, or that end thereof farthest from the end of the shaft. This may easily be accomplished by dipping the end of the shaft with the properly adjusted loosely enveloping guard into a vessel of melted solder to the required distance. The shaft-attached guard is afterward soldered fast in the socket of the end connection C. The completed shaft is now ready to be connected with the handpiece spindle end G and with the driven-pulley of a dental engine in usual well-known ways.

By the employment in the manner above explained of the guard F instead of inserting the shaft ends directly into the sockets of the end-connections and soldering them in place, I overcome serious objections such as now to be stated:—As the stiff guard surrounds and braces the shaft for some distance beyond that portion thereof to which solder has been applied the destruction of the temper of the shaft coils adjacent to the soldered portion of the shaft by the heat imparted in soldering, does not result in impairing the working efficiency of the shaft; and no portion of the shaft coils outside of the guard or adjacent to the open end or mouth thereof are liable to be united so as to stiffen the shaft by the application of solder; whereas, when the shaft ends are inserted and soldered directly in the sockets of the end-connections, heat is necessarily applied to the shaft outside the sockets and adjacent to their mouths and the temper of the coils at such points is liable to become destroyed or impaired to the great injury of the shaft. Moreover, in the old way the solder extended more or less along the shaft ends outside of or beyond the open ends or mouths of the sockets in which they were secured, thus filling the interstices between the coils, uniting them, and stiffening the shaft or destroying its resiliency for a greater or less distance outside the end-connections. Consequently even under moderate flexure the shaft would be liable to become kinked or when bent remain so, resulting in causing the shaft to run unsteadily or become set "out of true."

Obviously, the guards instead of being constructed precisely as above described, may be modified somewhat; as for instance, by making them bell-mouthed, or by internally flaring them so as to gradually enlarge their bores from points about midway their lengths toward their open ends or mouths, thus permitting to a greater extent than when the guard is of uniform internal diameter throughout of the lateral play or vibration of the shaft within the guard.

Figure 3:
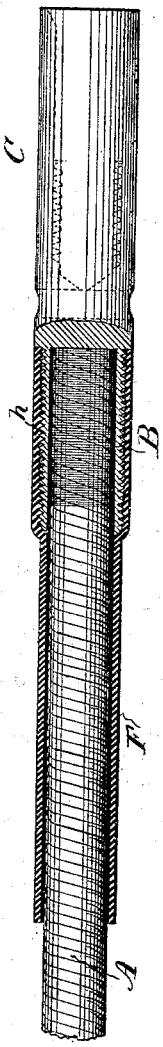

In accordance with the modification shown by Fig. 3 although the shaft is soldered directly in the socket of the end-connection in the old way, I retain essential advantages of my invention resulting from the employment of a tubular guard having rigid connection with the shaft. It will be seen that this rigid connection of the guard with the shaft is not direct as in the preferred construction, the guard being secured by way of the end-connection and extending beyond it as well as beyond the soldered and stiffened portion of the shaft, and enveloping the shaft so as to brace it and prevent kinking. In this modification the guard F having first been strung upon the shaft A, and the shaft inserted and soldered in the socket of the end-connection C the guard is then slid into position and secured at $h$ to the end-connection by screw threads within the guard and upon the end connection; or the attachment might be made by soldering or in other equivalent way.

Instead of the guard being shouldered as shown and closely enveloping the shaft and restricting lateral play or vibration thereof, it might be of uniform diameter throughout and the shaft be left free to flex within the guard to any extent which might be desired.

I claim as my invention—

1. The combination, with the flexible shaft, of the tubular end guards each having rigid connection at one end with an end of the shaft and at and adjacent to its opposite end loosely enveloping the shaft, substantially as and for the purpose set forth.

2. The combination with the flexible shaft consisting of coils soldered together at their ends, of the end connection (C or D) rigidly connected with the shaft end, and the tubular guard having rigid connection at one end with said end connection and the shaft end, and at and adjacent to its opposite end loosely enveloping the shaft, substantially as set forth.

In testimony whereof I have hereunto subscribed my name.

ARTHUR W. BROWNE.

Witnesses:
J. I. PEYTON,
EDW. F. SIMPSON, Jr.